Figures 1, 2:
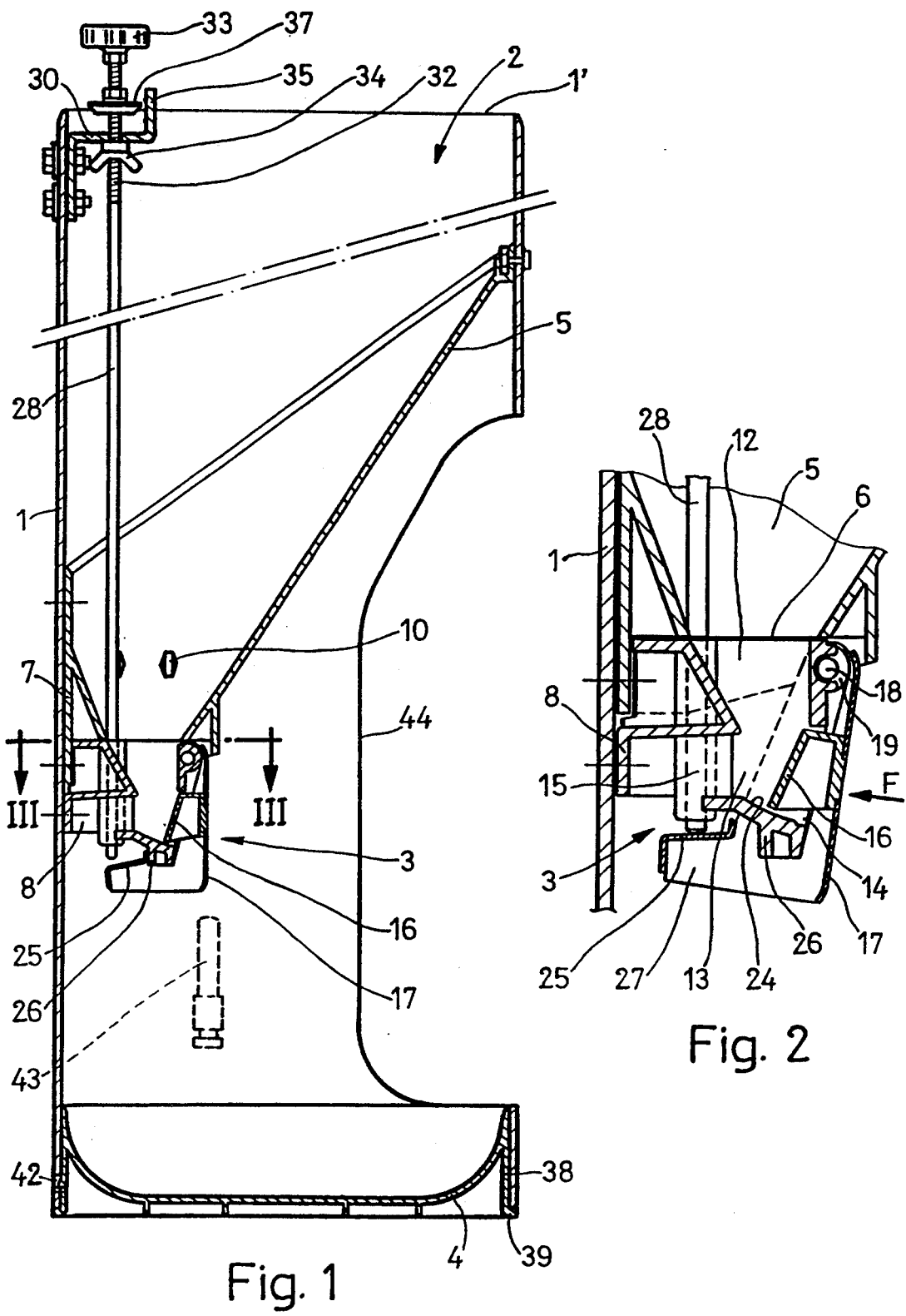

United States Patent [19]

Rovira Badia et al.

[11] Patent Number: 5,351,649
[45] Date of Patent: Oct. 4, 1994

[54] ANIMAL FEEDER

[75] Inventors: Antonio Rovira Badia; Jose Franco Tarazaga, both of Vilafranca Del Penedes, Spain

[73] Assignee: Technica E. Innovaciones Ganaderas S.A. (TIGSA), Vilafranca Del Penedes, Spain

[21] Appl. No.: 66,435

[22] Filed: May 25, 1993

[30] Foreign Application Priority Data

May 28, 1992 [ES] Spain .................................. 9201195
Dec. 2, 1992 [ES] Spain .................................. 9202447

[51] Int. Cl.⁵ .............................................. A01K 7/00
[52] U.S. Cl. .................................................. 119/53.5
[58] Field of Search ......................... 199/53.5, 51.5, 54

[56] References Cited

U.S. PATENT DOCUMENTS 4,315,483 2/1982 Scheidler ........................ 119/51.11

FOREIGN PATENT DOCUMENTS 2623140 1/1977 Fed. Rep. of Germany .
8102854 1/1983 Netherlands .
8501683 6/1985 Netherlands .
WO88/02597 4/1988 PCT Int'l Appl. .

Primary Examiner—Thomas Price
Attorney, Agent, or Firm—Jacobson, Price, Holman & Stern

[57] ABSTRACT

An animal feeder has a hopper provided with an adjustable dispensing valve which is operated by an animal. The lower part of the hopper terminates in a funnel forming a lower neck to which is attached a dispensing body consisting of a one-piece plastic part with a lower chamber in which a piston operates. The piston forms an integral part of a metal sluice which pivots about an axle which can be removed in order to disassemble the sluice. The sluice has a rear plate having a forward movement which is stopped by a vertically adjustable rod and a return movement which is stopped by a projection of the dispensing valve. An upper support for the rod consists of a small box provided with an upper slot along whose edge are provided reference marks which are pointed to by an indicator of a control mechanism. A plate which receives the feed is removably attached to a surrounding tubular body by means of a number of elastic tabs which are introduced into holes provided therein.

8 Claims, 3 Drawing Sheets

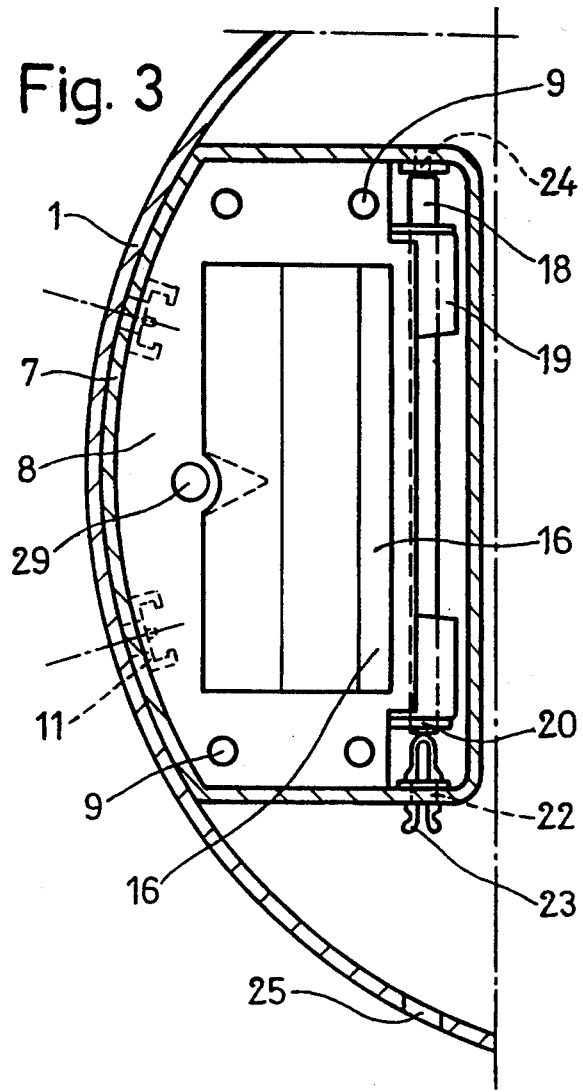
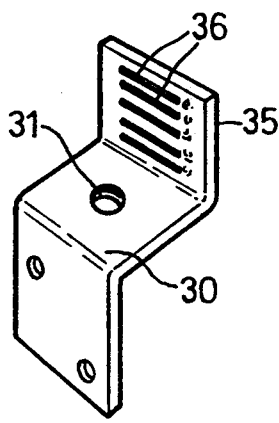
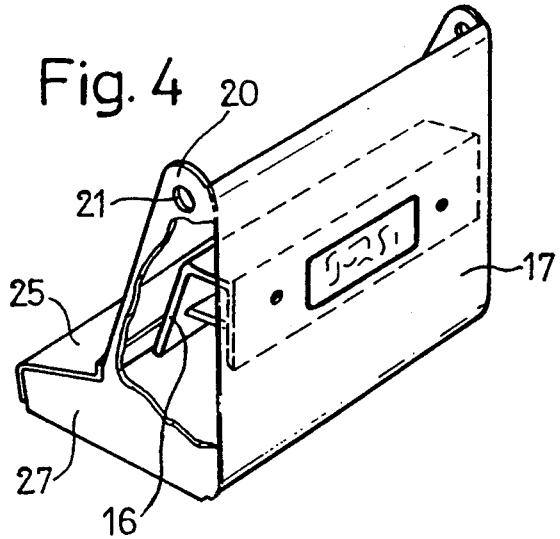
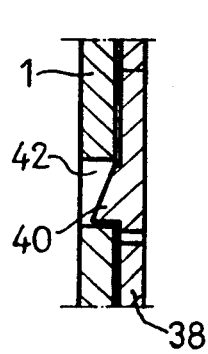
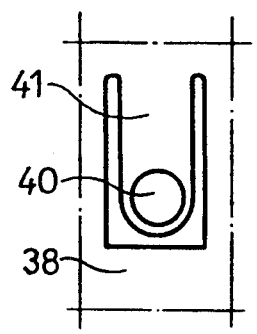

ANIMAL FEEDER

The present invention relates to a feeder for livestock, principally an individual feeder for pigs.

Their exists various models of this kind of feeder, all of which generally comprise a vertical tubular body forming a hopper with a dispensing valve whose output can be regulated, said valve being operated by the snout of the animal itself, the feeder additionally comprising a water supply valve which is also operated by the animal to mix the water with the feed if it should so desire, said mixture being produced in a lower plate joined to the tubular body.

Most of the dispensing valves which have been used until now consist of various metal parts joined together, increasing the cost of manufacture and making them very heavy. This, together with the pressure exerted by the animal to open them, cause them to come away from the surrounding body and the hopper, which consist of plastic material and cannot withstand such forces.

Other drawbacks of the known feeders are due to the difficulty with which said valves are disassembled for routine cleaning and the fact that the bottom of the hopper is constructed along an inclined plane defining a number of lateral spaces next to the lower outlet where the feed can get stuck, accumulate and begin to rot, with harmful consequences for the animal.

The object of the present invention is to solve these and other drawbacks by devising a dispensing valve which can be easily disassembled, has a hopper with a funnel-shaped bottom which has no gaps, a plate which is equally easy to disassemble and which rests directly on the floor.

In addition, the feeder is provided with a visual indication to show the adjustment of the dispensing valve.

In order to achieve these advantages a dispensing body made of plastic material is fixed vertically to a lower neck of the funnel-shaped bottom of the hopper and horizontally to the tubular body, said dispensing body forming an upper chamber which channels the feed and is connected to a lower dispensing chamber in which a piston operates, said piston forming an integral part of a metal sluice operated by the animal and hinged on said dispensing body.

Another characteristic of the present feeder is the fact that the sluice hinge axle can be disassembled from the dispensing body, said axle being kept in position by means of a spring pin which is fixed into an orifice of the lower neck of the hopper and through which said axle is fitted.

The invention is further characterized in that the bottom of the dispensing chamber is curved corresponding to the curve which the piston traces with the sluice as it rotates about the axle of the hinge, whereby all the feed dispensed is sent to the plate without bits accumulating in said chamber to start rotting.

The invention is further characterized by the constitution of the sluice end stop, which defines its rest position, and the dispensing valve adjustment means.

Furthermore the feeder is provided with means to enable the person in charge to manually adjust the dispensing valve with ease, without the need of special tools or equipment, said adjustment being carried out quickly and the resulting adjustment being clearly displayed by the position of the rod described at predetermined intervals.

To achieve these advantages the means described comprise an eccentric control provided with a toothed edge which acts by engaging, between said teeth, the rounded upper end of the rod, said rod abutting elastically against said edge. In this way, by rotating the eccentric control in either one direction or the other the rod can be raised or lowered.

The upper support which guides the rod consists of a small box where the eccentric control operates. The control extends from an upper curved slot in said box and is provided with an indicator which, as the control is rotated, points to the reference marks provided on the edge of said slot in correspondence with the various predetermined heights of the rod.

These and other characteristics will become more clear from the detailed description which follows, with the help of a series of drawings showing some practical embodiments which represent only one non-limiting example of the scope of the present invention.

Figure 10:
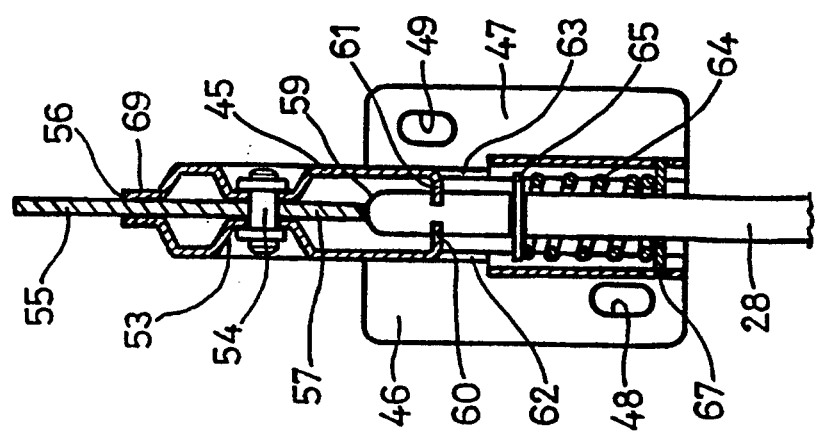
Figure 9:
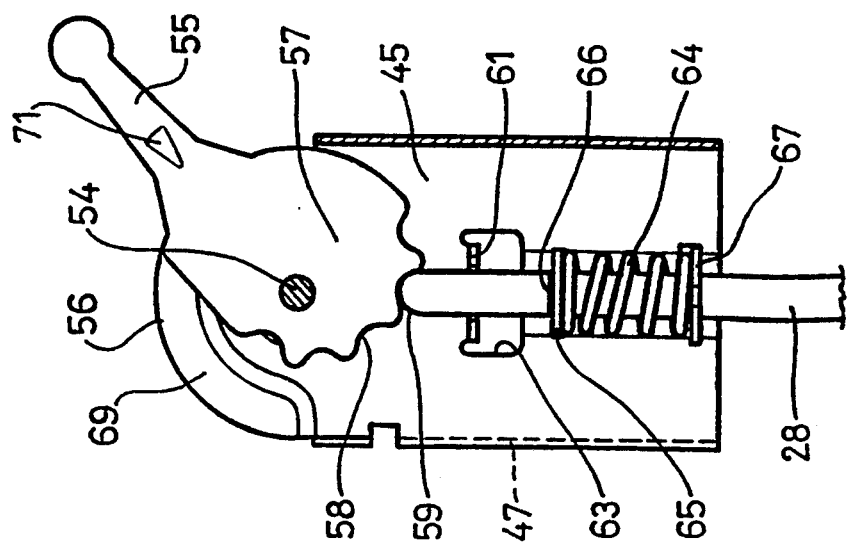
Figure 8:
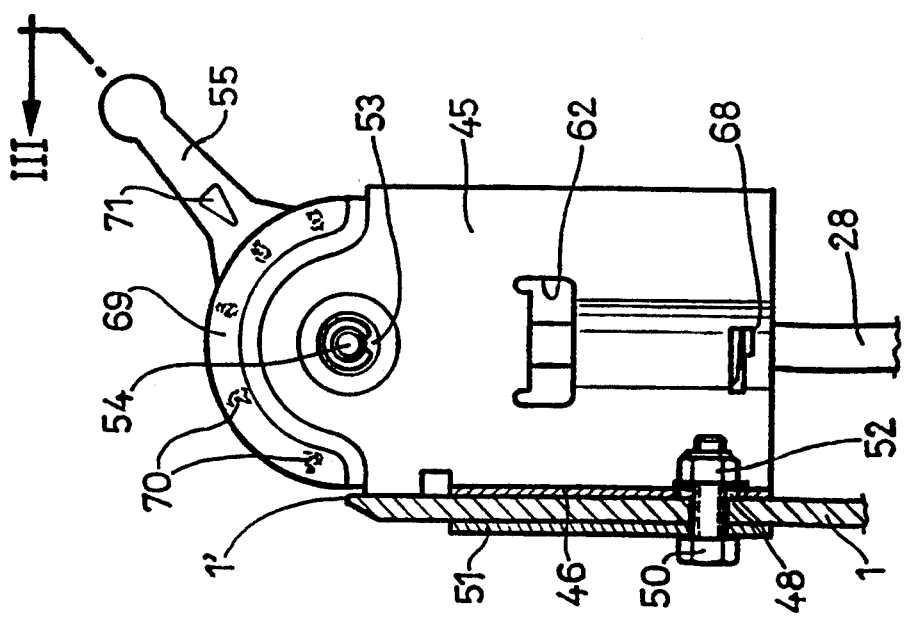

In the drawings:

FIG. 1 shows a sectional elevation of the feeder assembly,

FIG. 2 shows in elevated section a detail of the dispensing body when the piston being activated, FIG. 3 illustrates a sectional plan view of the feeder taken along the line III—III of FIG. 1, FIG. 4 represents a partially cut away perspective view of the metal sluice to which the piston is attached, FIG. 5 shows a perspective view of the bracket which is provided with reference marks to indicate the adjustment of the dispensing valve, FIG. 6 is a sectional elevation of a detail of the way in which the plate is joined to the surrounding tubular body, FIG. 7 shows a sectional detail of the tabs which join the plate to said body, FIG. 8 is a side elevation of a second embodiment of the control assembly which acts on the rod in order to adjust the dispensing valve, FIG. 9 shows a sectional side elevation of this control assembly, and FIG. 10 shows a longitudinal section of said assembly taken along the line III—III of FIG. 8.

According to the drawings, the pig feeder comprises a vertical tubular body 1 forming an upper hopper 2 whose lower outlet is provided with an adjustable dispensing valve 3 from which the feed falls onto a plate 4 which is joined below to said surrounding tubular body 1.

The hopper 2 consists of the upper part of the tubular body 1, the lower part closing in an asymmetric funnel with a lower rectangular opening 6 (FIG. 2) around which is formed a neck 7 (FIG. 3) to which the dispensing valve 3 is attached, the funnel being fixed to the tubular body at various points by nuts and bolts.

Said valve comprises a dispensing body 8 consisting of a one-piece plastic moulding which is fixed vertically to the funnel 5 beneath its opening by means of bolts which pass through the holes 9 in said body and are coupled to the corresponding nuts located inside the holes 10 in the funnel. The dispensing body 8 is also fixed horizontally to the tubular body 1 by means of radial bolts which are coupled to nuts located inside the housings 11 provided in said body 8.

The dispensing body forms an upper chamber 12 (FIG. 2) which channels the feed from the funnel 5 to a lower chamber 13 of said body where the feed is dispensed, the chamber comprising a frontal opening 14 and a rear opening 15. The frontal opening 14 houses a piston 16 which forms an integral part of a metal sluice 17 the upper part of which is hinged relative to the dispenser 8 by means of an axle 18, the upper part of said dispenser being horizontally provided with a pair of lateral tubular protuberances 19 into which the axle 18 is fitted, the sluice being attached to said axle by means of lateral lugs 20, each provided with holes 21 (FIG. 4).

The axle is removably attached so that the dispensing body 8 can be disassembled, to which end said axle is fitted through a square orifice 22 in the neck 7 of the funnel where a U-shaped elastic spring clip 23 is fitted such that once the spring clip 23 has been removed, the other end of the axle 18 can be accessed through an orifice 24, which is smaller in diameter than the axle and which is provided in said neck, to push the axle through the orifice 25 in the tubular body through which said axle was previously inserted (FIG. 3).

The animal operates the dispensing valve by pushing the sluice 17 with its snout as shown by the arrow F in FIG. 2. With this movement the piston 16 pushes the feed in the lower chamber 13 which then falls due to gravity onto the plate 4. The piston passes closely over the base 24 of said chamber, which is curved in correspondence with the curve which the piston traces as the sluice 17 moves about the axle 18.

When the animal withdraws, the sluice returns due to gravity to its rest position which is determined by a lower protrusion 26 of the dispensing body 8 acting as a stop against a plate 25 joined transversally to both of the lower prolongations 27 and at the back to the perforated lugs 20 of the sluice 17 (FIG. 4).

The amount of feed dispensed and falling onto the plate 4 when the sluice 17 is operated is determined by the lower end of a vertical rod 28 acting as a stop for the rear plate 25 of said sluice, said rod passing through the dispensing body via a hole 29 provided therein (FIG. 3) and being adjustable in height in the vertical position.

The upper part of the rod 28 is guided by a support 30 fixed inside the wall of the tubular body 1 next to the upper opening 1', said support forming a horizontal plane with a threaded orifice 31 which acts as a nut into which the upper threaded part 32 of the rod 28 is screwed such that when it is rotated by means of an upper knob 33, the rod, and therefore its lower end, can be raised or lowered, thereby regulating the amount of travel of the sluice/piston assembly.

The position of adjustment chosen for the amount of feed dispensed is fixed by a wingnut 34 acting as a locknut which is screwed onto the rod 28 and which abuts against the support 30.

These adjustment means are provided with a visual indicator of the position of the rod consisting of a bracket 35 which extends vertically upwards and forms part of the support 30, said bracket being provided with reference marks 36 which are at different heights (FIG. 5) and which are indicated by an indicating disc 37 screwed onto the rod 28.

The plate 4 is joined to the tubular body in a simple way which enables it to be disassembled without the need of any tools. To achieve this, the plate is provided with a peripheral wall 38 whose external diameter corresponds to the internal diameter of the body 1, said wall being provided with an outwardly oriented lower flange 39 via which the plate rests on the floor, the lower opening of the tubular body being positioned on this flange.

The plate is removably fixed to the tubular body by means of elastic tabs 40 which are provided on the wall (FIG. 6) and which are each located on a tongue 41 stamped out of said wall, each of said tabs fitting into orifices 42 provided in the lower part of the tubular body 1.

The water supply valve 43 can also be operated by the animal if it wishes to eat moist feed, the animal being able to access the feed and the water via the lateral opening 44 in the tubular body 1.

As shown in FIG. 8, which corresponds to the second version of the control assembly which regulates the dispensing valve, a radially arranged small flat box 45 is fixed to the inner part of the upper opening 1' of the vertical tubular body 1 of the feeder, said box being fixed to said body by means of two lateral wings 46 and 47 which are each provided with coplanar orifices 48 and 49 through which bolts 50 are inserted, passing through the tubular body 1 and a reinforcement plate 51 provided on the external face, said bolts being secured with the corresponding nuts 52.

The two opposed faces of the upper part of said box 45 are each pressed and holes made therein to provide recesses 53 into which a transverse axle 54 is fitted. The control 55, which pivots about said axle and whose upper part projects through a curved slot 56, comprises an eccentric 57 with a toothed edge 58, the control actuating via said edge which presses on the rounded upper end 59 of the vertical rod 28 of which said box constitutes the upper guide support.

The upper end of the rod 28 is guided within the box 45 by means of two opposing tabs 60 and 61 which have curved edges and which are each produced by stamping out parts 62 and 63 of the two opposing faces of the box.

The rod 28 is elastically arranged against the toothed edge 58 of the control 55 by means of a spring 64 which is positioned on the rod, the upper part of said spring abutting a washer 65 fixed to a peripheral neck of the rod 28. The lower part of said spring abuts another washer 67 which is positioned freely on the rod 28 and which is fixed into lateral cut-outs 68 in the box 45.

The curved slot 56 is pressed out giving rise to a part 69 on which a series of reference marks 70, for example numbers, are provided in correspondence with the various predetermined positions in height of the rod 28, said reference marks being pointed to by an indicator 71 to show the height chosen.

We claim:

1. An animal feeder of the type which comprises a tubular body with a hopper having an outlet provided with an adjustable dispensing valve to be operated by an animal so that feed from the hopper falls onto a plate below to the tubular body, characterized in that the hopper comprises a lower funnel with a lower opening which forms a neck to which is attached a dispensing body consisting of a one-piece plastic moulding fixed vertically to said opening and horizontally to the tubular body so as to form an upper chamber which channels the feed and which is connected to a lower dispensing chamber provided with two openings including one frontal opening and one rear opening, the frontal opening of which houses a piston forming an integral part of a pivotal metal sluice defining said valve to be operated by the animal and the sluice having an upper part pivoted on the dispensing body, the dispensing body being provided with a pair of tubular extensions into which a pivot axle for the sluice is fitted, the sluice being attached to said axle by means of perforated lateral lugs provided on the sluice.

2. An animal feeder according to claim 1 wherein the pivot axle is fitted through an orifice in the neck of the funnel and into which a spring clip is removably inserted in order that the axle may be extracted when necessary.

3. An animal feeder according to claim 1 wherein the lower dispensing chamber has a base which is curved in correspondence with a curve which the piston traces as it moves due to rotation of the sluice.

4. An animal feeder according to claim 1 wherein the lateral lugs of the sluice have lower parts which extend backwards forming an integral part of a transverse plate for which a lower projection of the dispensing body acts as a stop for the sluice when the sluice returns to a rest position after operation by an animal.

5. An animal feeder according to claim 1 which includes a rod, which can be moved vertically in order to adjust the dispensing valve, wherein the rod is guided by an upper support fixed to the tubular body and by a vertical hole provided in the dispensing body, the rod having a lower end acting as a stop for the sluice by contact with a transverse plate of the sluice; the upper support being provided with a vertical bracket with reference marks at various heights and which are pointed to by an indicator attached to the movable rod.

6. An animal feeder according to claim 5 wherein the rod is operated and adjusted in its movement by a control consisting of a toothed eccentric having an edge with teeth between which a rounded upper end of the rod selectively engages, said rod abutting elastically against said edge.

7. An animal feeder according to claim 6 wherein the upper support which guides the rod includes a box with an upper curved slot from which a control arm for the eccentric projects, said control arm being provided with an indicator which points to reference marks distributed along an edge of said slot in correspondence with selected positions of the eccentric and which define various predetermined positions in height of the rod.

8. An animal feeder according to claim 1 wherein the plate is provided with a peripheral wall with an external lower flange to rest on the ground and on which the lower opening of the tubular body is positioned, said wall comprising a number of elastic tabs which project from its periphery and fit into orifices provided in the lower part of the tubular body to removably attach it to the plate.

* * * * *

UNITED STATES PATENT AND TRADEMARK OFFICE
CERTIFICATE OF CORRECTION

PATENT NO. : 5,351,649

DATED : October 4, 1994

INVENTOR(S) : Rovira Badia et al.

It is certified that error appears in the above-identified patent and that said Letters Patent is hereby corrected as shown below:

On the title page, Assignee: [73], "Technica E. Innovaciones Ganaderas S.A. (TIGSA)" should read —Tecnica E Innovaciones Ganaderas, S.A. (TIGSA)—

Signed and Sealed this

Thirtieth Day of April, 1996

Attest:

Attesting Officer

BRUCE LEHMAN

Commissioner of Patents and Trademarks